(12) United States Patent
Aerrabotu

(10) Patent No.: US 7,155,219 B2
(45) Date of Patent: Dec. 26, 2006

(54) PREFERRED ROAMING LIST AND ROAMING INDICATOR PROVISION AND SYNCHRONIZATION

(75) Inventor: Naveen Aerrabotu, Gurnee, IL (US)

(73) Assignee: Motorola Inc., Schaumburg, IL (US)

( * ) Notice: Subject to any disclaimer, the term of this patent is extended or adjusted under 35 U.S.C. 154(b) by 50 days.

(21) Appl. No.: 10/268,824

(22) Filed: Oct. 10, 2002

(65) Prior Publication Data

US 2004/0198350 A1    Oct. 7, 2004

(51) Int. Cl.
*H04Q 7/20* (2006.01)
(52) U.S. Cl. .............. 455/432.1; 455/452.2; 455/435.1; 455/435.2
(58) Field of Classification Search .......... 455/432.1, 455/432.3, 435.3, 551, 436, 186.1, 550.1, 455/552.1, 435.1, 419, 422.1, 435.2, 449, 455/432.2; 375/130, 432
See application file for complete search history.

(56) References Cited

U.S. PATENT DOCUMENTS

| | | | |
|---|---|---|---|
| 6,148,197 A * | 11/2000 | Bridges et al. .......... 455/432.3 |
| 6,201,964 B1 * | 3/2001 | Tung et al. .............. 455/432.1 |
| 6,564,055 B1 * | 5/2003 | Hronek ....................... 455/433 |
| 6,584,311 B1 * | 6/2003 | Sorenson et al. ......... 455/432.1 |
| 6,587,685 B1 * | 7/2003 | Mittal et al. ................. 455/419 |
| 6,625,451 B1 * | 9/2003 | La Medica et al. .......... 455/434 |
| 6,993,336 B1 * | 1/2006 | Aerrabotu et al. .......... 455/437 |
| 6,996,398 B1 * | 2/2006 | Powell ........................ 455/433 |
| 7,000,230 B1 * | 2/2006 | Murray et al. .............. 717/172 |
| 2001/0001761 A1 * | 5/2001 | Tung et al. ................... 455/432 |
| 2001/0055328 A1 * | 12/2001 | Dowling ....................... 375/130 |
| 2002/0107017 A1 * | 8/2002 | Song ............................ 455/432 |
| 2002/0160763 A1 * | 10/2002 | Mittal et al. ................ 455/418 |
| 2003/0083064 A1 * | 5/2003 | Cooper ........................ 455/432 |
| 2003/0088539 A1 * | 5/2003 | Andrus et al. ................. 707/1 |
| 2003/0103484 A1 * | 6/2003 | Oommen et al. ........... 370/338 |
| 2003/0129979 A1 * | 7/2003 | Cooper ........................ 455/432 |
| 2003/0134637 A1 * | 7/2003 | Cooper ........................ 455/432 |
| 2003/0148786 A1 * | 8/2003 | Cooper et al. .............. 455/552 |
| 2004/0005892 A1 * | 1/2004 | Mayer et al. ............. 455/432.1 |
| 2004/0009772 A1 * | 1/2004 | Mazzara, Jr. ............... 455/436 |
| 2004/0063427 A1 * | 4/2004 | Narasimha et al. ......... 455/434 |
| 2004/0203692 A1 * | 10/2004 | Schwinke et al. .......... 455/419 |
| 2004/0203747 A1 * | 10/2004 | Uchida .................... 455/432.1 |
| 2005/0101323 A1 * | 5/2005 | De Beer .................. 455/435.2 |

FOREIGN PATENT DOCUMENTS

WO    WO03105512    * 12/2003

OTHER PUBLICATIONS

"Over-the-Air Service Provisioning of Mobile Stations in Spread Spectrum Systems", TIA/EIA/IS-683-A;19, Ballot Resolution Version, Apr. 1998, 16 pages.
"Administration of Parameter Value Assignments for cdma2000 Spread Spectrum Standards", Release C, 3GPP2 C.R1001-C, Version 1.0, Jan. 11, 2002, 46 pages.

* cited by examiner

*Primary Examiner*—Joseph Feild
*Assistant Examiner*—Khawar Iqbal
(74) *Attorney, Agent, or Firm*—Hisashi D. Watanabe; Joseph T. Cygan

(57) ABSTRACT

A method for synchronizing multiple database that are provided at different times is provided. As a wireless communication device (102) leaves a first region (104) and enters a second region (108), it is provided with a new preferred roaming list information (204) which may no longer be synchronized with a stored functionality extension table. Based upon information included in the new preferred roaming list information, an appropriate functionality extension table (214) that is synchronized to the new preferred roaming list is received.

15 Claims, 4 Drawing Sheets

PREFERRED ROAMING LIST AND ROAMING INDICATOR PROVISION AND SYNCHRONIZATION

FIELD OF THE INVENTION

The present invention relates generally to a method of providing and synchronizing separate data sets. More specifically, the present invention relates to a method in a wireless communication device synchronizing one data set with another based upon a data parameter.

BACKGROUND OF THE INVENTION

It is known to provide a cellular telephone, or a mobile terminal, using the Code Division Multiple Access ("CDMA") with a table called Preferred Roaming List ("PRL"). Based upon the information contained in the PRL, such as System Identification ("SID") and Network Identification ("NID"), the mobile determines the most appropriate network to register itself. Depending on the availability of systems and networks in the environment where the mobile is in, the mobile may receive a new PRL appropriate for the current environment of the mobile over the air to replace the existing PRL. Currently, the mobile supports three types of roaming indicators associated with the PRL, which help notify the user the roaming status of the mobile in the current environment. For example, the first type of the indicators may indicate that the mobile is in a home network, i.e., not roaming, by having the roaming indicator light turned off; the second type of the indicators may indicate that the mobile is in a preferred roaming network by having the roaming indicator light turned on; and the third type of the indicators may indicate that the mobile is in a non-preferred roaming network by having the roaming indicator light flashing. As defined in TIA/EIA TSB58b section 8.1, enhanced roaming indicators ("ERI"), supporting more than three types of indicators, may be provided in the mobile to enhance the roaming condition conveyed to the user. However, as the mobile roams and its PRL is replaced with a new and different PRL, the ERI may not be correctly associated with the new PRL.

Accordingly, there is a need for a method in a wireless communication device for synchronizing two different sets of data, which are acquired by the wireless communication device at separate instances.

DETAILED DESCRIPTION OF THE PREFERRED EMBODIMENT(S)

The present invention generally relates to a method in a wireless communication device for synchronizing two sets of data that are received at two separate instances.

In some applications, a first set of data, for example, a preferred roaming list ("PRL") or an extended preferred roaming list ("EPRL") is stored in the wireless communication device, and a second set of data, for example, enhanced roaming indicators ("ERI"), associated with or synchronized to the first set of data is also stored in the wireless communication device.

As the wireless communication device roams from one environment to the next, the wireless communication device may receive a new PRL, which may not be synchronized to the current ERI already stored in the device, depending upon the availability of systems and networks in the new environment. According to one aspect of the invention, the wireless communication device receives an ERI that is synchronized to the new PRL based on a parameter of the new PRL.

Figure 1:
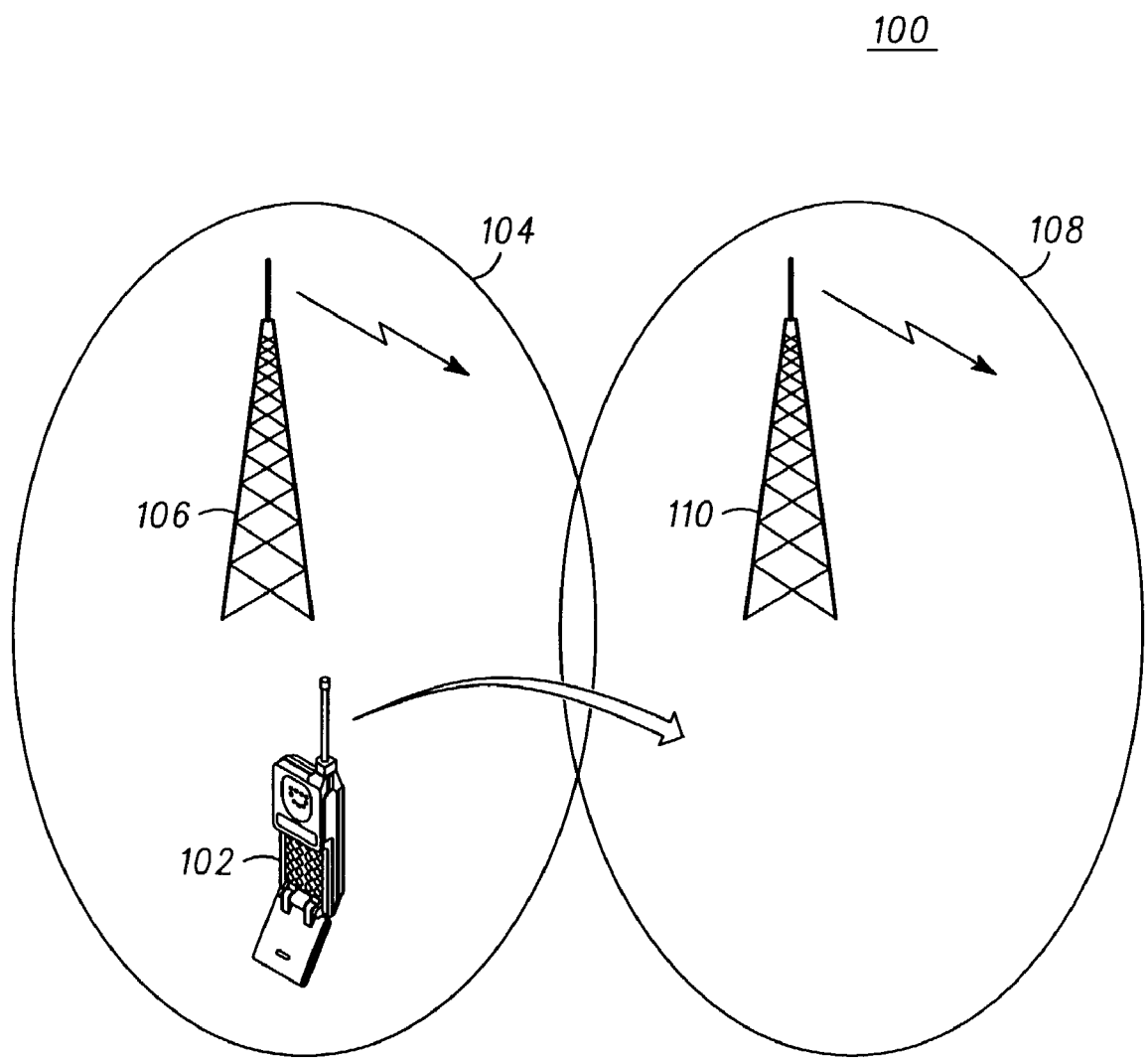
FIG. 1 is an exemplary environment where the method of the present invention may be initiated.

FIG. 1 is an exemplary environment where some aspects of the present inventions may be practiced. When a wireless communication device 102 located in a first region 104, which has been operating in a first network 106 provided by Carrier A, leaves the first region and enters a second region 108, it may be necessary for the wireless command device to register and operate in a second network 110 provided by a different carrier, Carrier B.

A home carrier of the wireless communication device may have different contracts with each of the Carriers A and B, which may affect the fee charged to the wireless communication device, for example when the wireless communication device is roaming. To assist in determining the status of the wireless communication device in the network, the wireless communication device may receive a preferred roaming list. In other applications, the mobile device may receive lists or data sets other than a preferred roaming list.

Figure 2:
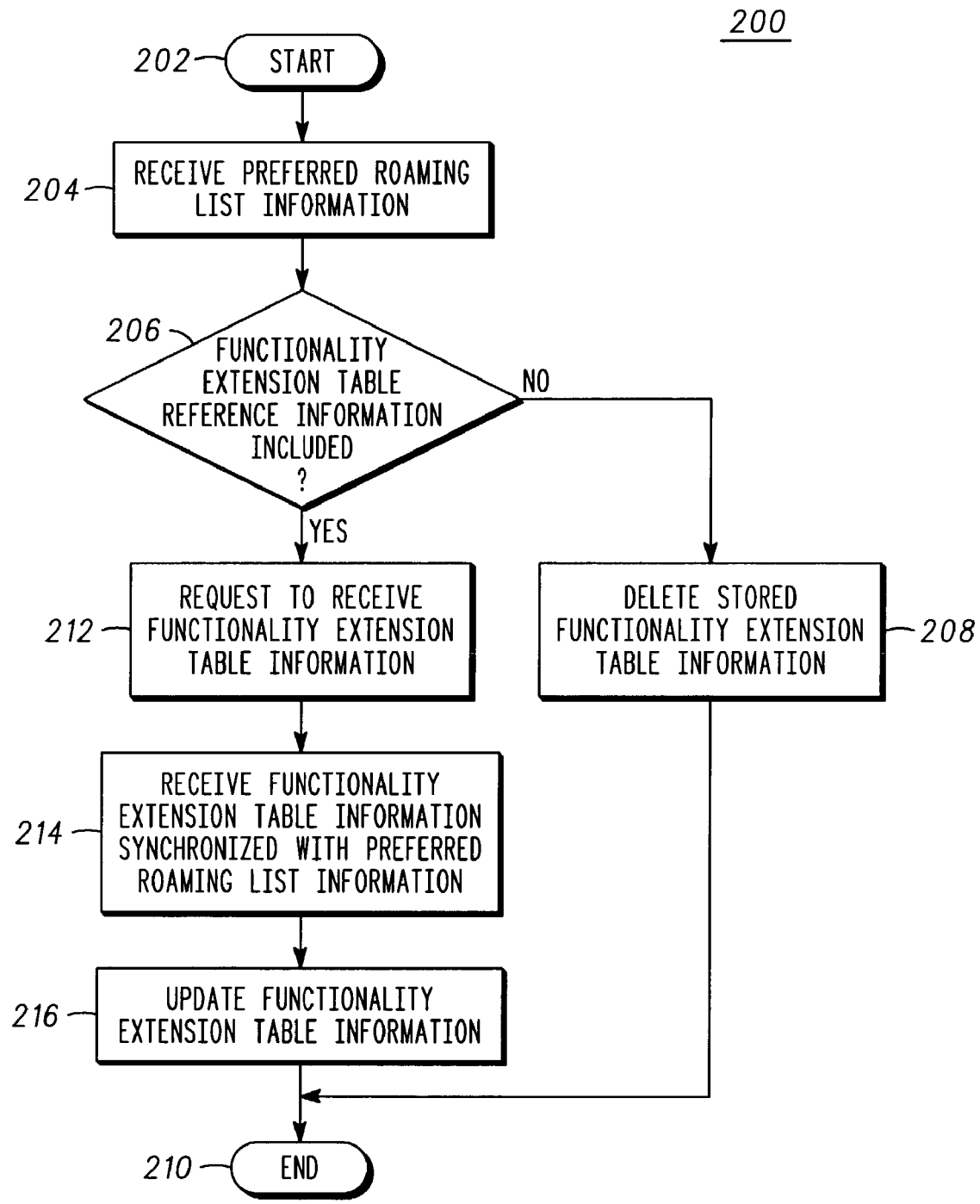
FIG. 2 is an exemplary flow chart of the first embodiment of the present invention in a wireless communication device.

Referring to FIG. 2, there is provided an exemplary flow chart of the first embodiment of the present invention in a wireless communication device. At block 202, this process is initiated when the wireless portable communication device, preferably a portable radiophone, leaves a first region and enters a second region. Upon entering the second region, the wireless communication device receives a preferred roaming list information such as, but not limited to, a preferred roaming list ("PRL") or an extended preferred roaming list ("EPRL"), at block 204. The wireless communication device, then at block 206, determines if the received preferred roaming list information contains information referring to a functionality extension table such as but not limited to, a roaming indicator and an enhanced roaming indicator, which may compliment the functionality of the received preferred roaming list information. If the received preferred roaming list information does not contain any reference to a functionality extension table, then any functionality extension table previously stored may be deleted in block 208, and the wireless communication resumes its normal operation in block 210. If the received preferred roaming list information contains a reference to a functionality extension table, then the wireless communication device requests for the functionality extension table information in block 212, and in response to the request, the wireless communication device receives the functionality extension table information that is synchronized to the received preferred roaming list information in block 214. The wireless communication device then updates the stored functionality extension table information in block 216, ends the process in block 210, and resumes its normal operation. After block 216, a third database such as, but not limited to, a call prompt table further complimenting at least one of the preferred roaming list and the functionality extension table, may be received based upon a reference included in the preferred roaming list information or the functionality extension table information. Alternatively, the call prompt table may be included in the preferred roaming list or the functionality extension table.

Figure 3:
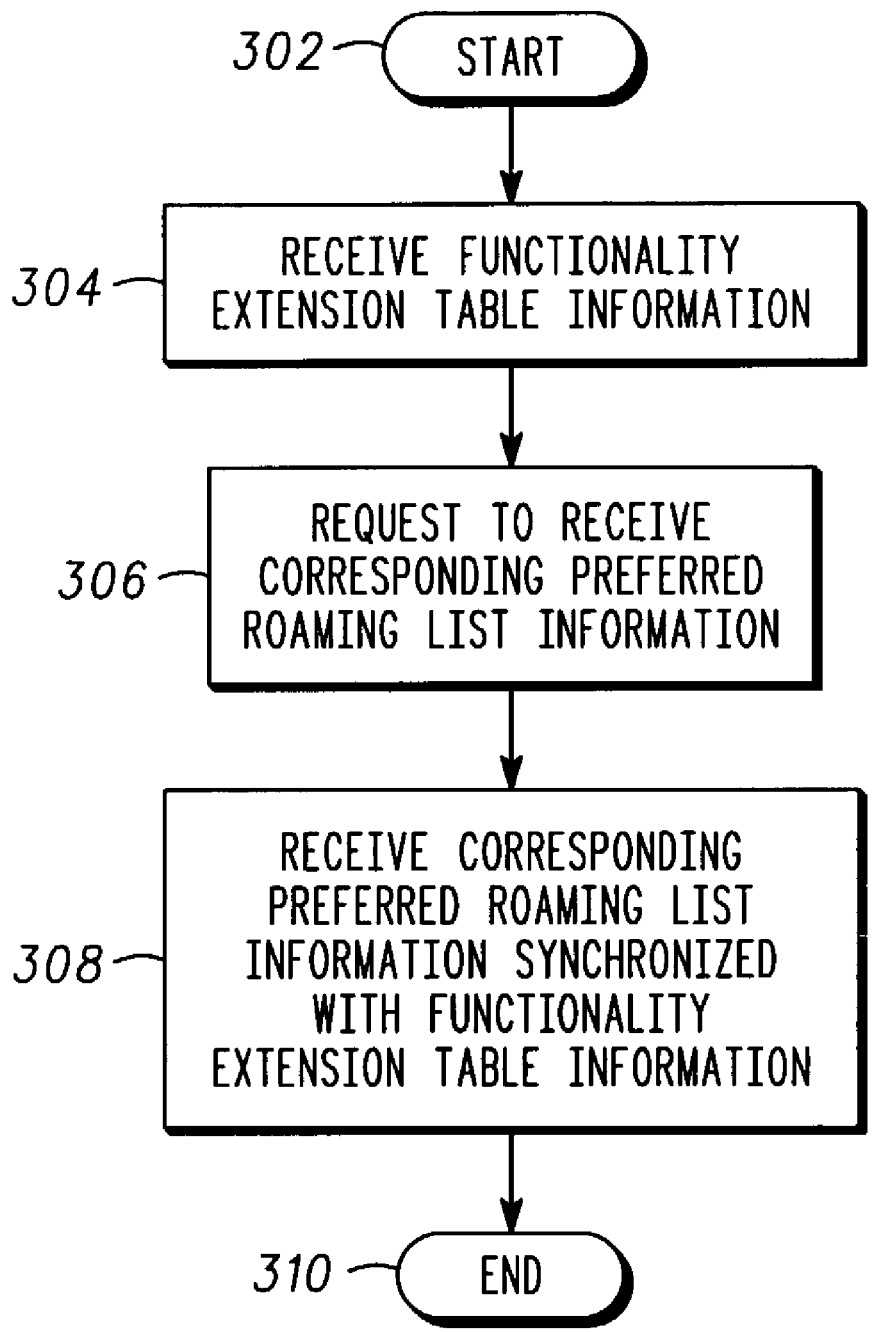
FIG. 3 is an exemplary flow chart of the second embodiment of the present invention in a wireless communication device.

Referring to FIG. 3, there is provided an exemplary flow chart of another aspect of the invention in a wireless communication device. As shown in the previous example of FIG. 2, this process is initiated when the wireless portable communication device leaves the first region and enters the second region in block 302. Upon entering the second region, the wireless communication device receives functionality extension table information in block 304. Based upon the received functionality extension table information, the wireless communication device requests to receive a corresponding preferred roaming list information in block 306. The wireless communication device then receives the corresponding preferred roaming list information that is synchronized to the received functionality extension table information in block 308, ends the process in block 310, and resumes its normal operation.

In both examples of FIG. 2 and FIG. 3, the synchronization between the preferred roaming list information and the functionality extension table information may be accomplished by maintaining a list of compatible versions or a list of compatible pairs in the network from which the wireless communication device receives the information.

Figure 4:
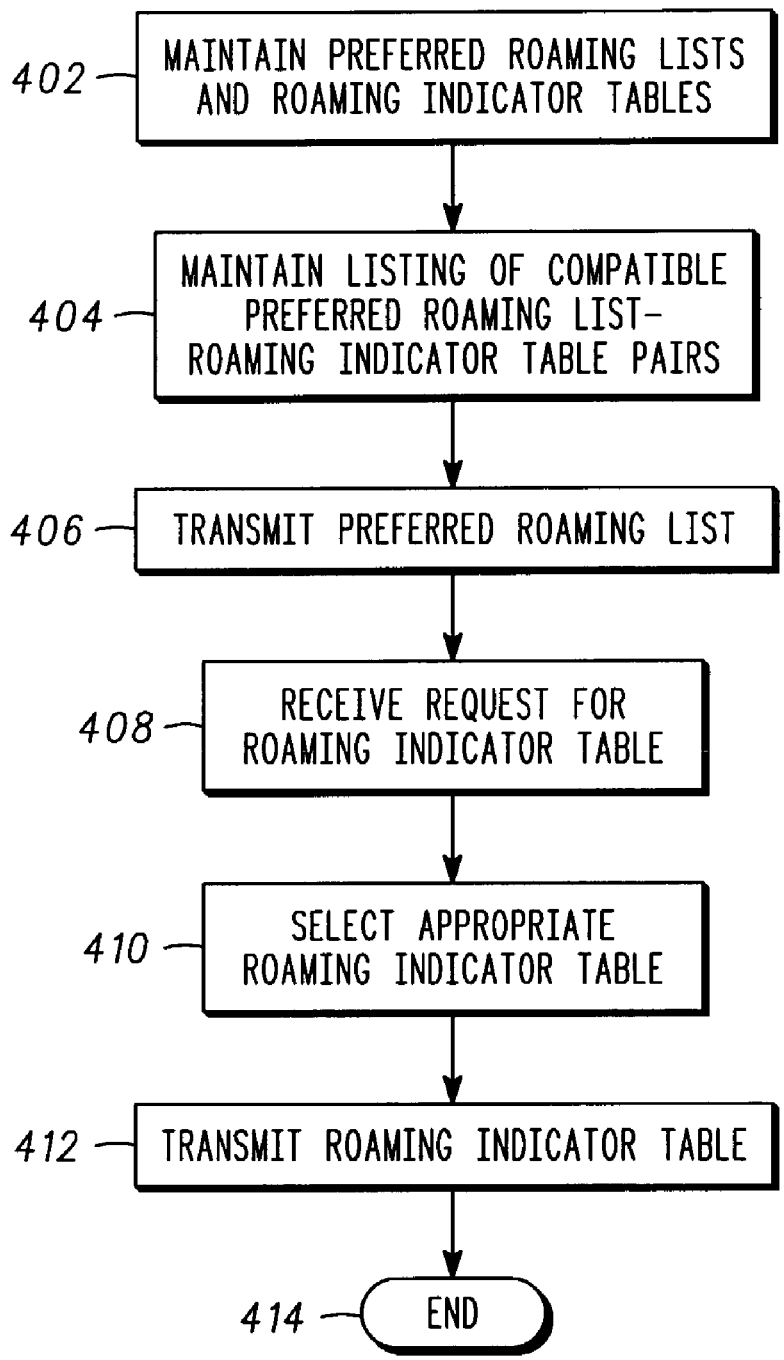
FIG. 4 is an exemplary flow chart of the third embodiment of the present invention in a network.

Referring to FIG. 4, there is provided an exemplary flow chart of the third embodiment of the present invention in a network. As shown in block 402, the network maintains a plurality of preferred roaming lists and roaming indicator table, which may be updated periodically. The network also maintains a listing of a plurality of compatible preferred roaming list and roaming indicator table pairs in block 404. For example, the preferred roaming list version 1 may be compatible with the roaming indicator table version 3 but not with the roaming indicator table version 2; and the preferred roaming list version 2 may be only compatible with the roaming indicator table version 5. As the network detects a wireless communication device leaving the first region and entering the second region, the network transmit one of the preferred roaming list having a version number of the plurality of preferred roaming lists maintained in the network in block 406. Then the network receives the version number and a request for a corresponding roaming indicator table in block 408. In addition, the network may receive the capability and status of the wireless communication device to avoid transmitting a roaming indicator table that is compatible with the preferred roaming list but not with the wireless communication device. Based upon the version number received, the network selects the appropriate roaming indicator table that is synchronized with the preferred roaming list having that version number in block 410. The network then transmits the selected roaming indicator table in block 412, and completes the process in block 414.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method in a wireless communication device, comprising:
   receiving preferred roaming list information;
   determining whether the preferred roaming list information includes functionality extension table reference information;
   requesting a functionality extension table information corresponding to said functionality extension table reference information, said functionality extension table information containing data associated with said preferred roaming list information if the preferred roaming list information includes functionality extension table reference information; and
   receiving the functionality extension table information in response to the request, the functionality extension table information received synchronized with the preferred roaming list information.

2. The method of claim 1, updating any functionality extension table information stored previously on the wireless communication device with the functionality extension table information received in response to the request.

3. The method of claim 1, requesting call prompt table information if the preferred roaming list includes call prompt table reference information.

4. The method of claim 3, receiving the call prompt table information in response to the request, the call prompt table information received synchronized with the preferred roaming list information.

5. The method of claim 2, requesting call prompt table information if the functionality extension table includes call prompt table reference information.

6. The method of claim 5, receiving the call prompt table information in response to the request, the call prompt table information received synchronized with the functionality extension table.

7. The method of claim 1, deleting any previously stored functionality extension table information on the wireless communication device if the preferred roaming list information does not include functionality extension table reference information.

8. A method in a wireless communication device, comprising:
   receiving functionality extension table information;
   synchronizing the functionality extension table information with preferred roaming list information by requesting preferred roaming list information corresponding to the functionality extension table information received; and
   receiving preferred roaming list information referencing the functionality extension table information in response to the request, wherein the functionality extension table information contains data associated with said preferred roaming list information.

9. A method in a wireless communication network, comprising:
   maintaining an information base correlating compatible versions of wireless communications device functionality extension table information and corresponding wireless communication device preferred roaming list information, the preferred roaming list information including references to the functionality extension table information, wherein the functionality extension table information includes data associated with the preferred roaming list information;
   sending the functionality extension table information to a wireless communication device in response to a request from the wireless communication device; and
   sending the corresponding preferred roaming list information to the wireless communication device.

10. The method of claim 9, sending the functionality extension table information to the wireless communication device after sending the corresponding preferred roaming list information.

11. The method of claim 9, sending the preferred roaming list information to the wireless communication device in response to a request from the wireless communication device.

12. The method of claim 11, sending the preferred roaming list information to the wireless communication device after sending the corresponding functionality extension table information.

13. A method in a radiotelephone for synchronizing a preferred roaming list with a roaming indicator table, the preferred roaming list having a list version number, comprising:

receiving the preferred roaming list including a functionality extension table reference information;

transmitting the list version number and a request to receive a functionality extension table information corresponding to said functionality extension table reference information and including the roaming indicator table corresponding to the list version number; and receiving said functionality extension table information including the roaming indicator table corresponding to the list version number, the roaming indicator table including data associated with the preferred roaming list.

14. A method in a radiotelephone network for providing a preferred roaming list and a roaming indicator table, comprising:

maintaining a plurality of preferred roaming lists and roaming indicator tables;

maintaining a listing of a plurality of compatible preferred roaming list and roaming indicator table pairs;

transmitting a first preferred roaming list of the plurality of preferred roaming lists having a first list version number;

receiving the first list version number of the first preferred roaming list and a request to transmit a first roaming indicator table of the plurality of roaming indicator tables;

selecting the first roaming indicator table based upon the first list version number and the listing of compatible preferred roaming list and roaming indicator table pairs; and transmitting the first roaming indicator table, the first roaming indicator table including data associated with the first preferred roaming list.

15. A method in a radiotelephone for replacing a first preferred roaming list and a first roaming indicator table, comprising:

receiving a second preferred roaming list having a second list version number;

replacing the first preferred roaming list with the second preferred roaming list;

transmitting the second list version number and a request to receive a second roaming indicator table corresponding to the second list version number;

receiving the second roaming indicator table corresponding to the second list version number, the second roaming indicator table including data associated with said second preferred roaming list; and replacing the first roaming indicator table with the second roaming indicator table.

* * * * *